(12) United States Patent
Dahlfort et al.

(10) Patent No.: US 8,811,820 B2
(45) Date of Patent: Aug. 19, 2014

(54) OPTICAL PORT DISCOVERY IN A WDM OPTICAL NETWORK

(71) Applicant: Telefonaktiebolaget L M Ericsson (PUBL), Stockholm (SE)

(72) Inventors: Stefan Dahlfort, Santa Clara, CA (US); Kim Laraqui, Solna (SE); Ming Xia, Milpitas, CA (US); Peter Öhlén, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 56 days.

(21) Appl. No.: 13/731,062

(22) Filed: Dec. 30, 2012

(65) Prior Publication Data

US 2014/0186037 A1   Jul. 3, 2014

(51) Int. Cl.
  *H04J 14/00*  (2006.01)
(52) U.S. Cl.
  USPC .......... 398/72; 398/68; 398/100; 398/48; 398/49; 398/33; 398/59; 398/82; 370/352; 370/392; 370/389; 370/468
(58) Field of Classification Search
  USPC ........... 398/66, 67, 68, 69, 70, 71, 72, 79, 82, 398/59, 33, 38, 98, 99, 100, 45, 48, 49, 58, 398/83, 85; 370/352, 389, 392, 468, 395.31
  See application file for complete search history.

(56) References Cited

U.S. PATENT DOCUMENTS 6,147,786 A * 11/2000 Pan .................................. 398/1
7,974,533 B2 * 7/2011 Wellbrock et al. ............. 398/82

* cited by examiner

*Primary Examiner* — Hanh Phan (57) ABSTRACT

A hub node in a wavelength division multiplexed optical network automatically discovers at least one of new client-side optical ports and new edge-side optical ports. The hub node comprises a wavelength switch network, port discovery equipment, and a controller. The wavelength switch network routes any wavelength channel that does not support a matching pair of client-side and edge-side ports to port discovery equipment at the hub node. The port discovery equipment searches for new ports, and, responsive to finding a new port, automatically discovers a predefined set of one or more attributes of the new port. The controller determines that a client-side port and an edge-side port are a matching pair of ports if discovered sets of attributes of those ports match according to one or more predefined rules. The controller then controls the wavelength switch network to re-route the wavelength channel supporting that matching pair between those ports.

20 Claims, 7 Drawing Sheets

OPTICAL PORT DISCOVERY IN A WDM OPTICAL NETWORK

TECHNICAL FIELD

The present invention generally relates to a wavelength division multiplexed (WDM) optical network, and particularly relates to optical port discovery in such a network.

BACKGROUND

Conventional approaches to transporting mobile, business, and residential service traffic have dedicated different parallel networks to transporting the traffic of different services. More recent approaches, by contrast, contemplate transporting the traffic of those different services together using the same network. Converging the different parallel networks into one common network in this way would prove more efficient and cost-effective.

Aggregating the traffic of multiple services at the packet level through so-called packet aggregation presents one option for realizing such a "converged" network. But while packet aggregation currently requires less hardware expense, it proves difficult to scale as traffic volume increases and involves significant complexity. Aggregating the traffic of multiple services in the optical domain, e.g., using wavelength division multiplexing (WDM), is more promising in this regard. However, one obstacle to realizing a converged WDM optical network is optical port discovery.

SUMMARY

One or more embodiments herein provide automatic discovery of optical ports in a wavelength division multiplexed (WDM) optical network. Eliminating or at least reducing network management costs, the embodiments prove especially useful in a converged WDM optical network that aggregates the traffic of multiple services in the optical domain.

More particularly, embodiments herein include a hub node in a WDM optical network configured to automatically discover at least one of new client-side optical ports at client nodes and new edge-side optical ports at service edge nodes. The hub node comprises a wavelength switch network, port discovery equipment, and a controller. The wavelength switch network is configured to route any wavelength channel that supports a matching pair of client-side and edge-side optical ports between those ports, and to route any wavelength channel that does not support such a matching pair to the port discovery equipment.

The port discovery equipment is configured to search for new client-side or edge-side optical ports by scanning for the presence of a predefined signal on wavelength channels routed to the port discovery equipment. Responsive to finding a new optical port, the port discovery equipment is configured to automatically discover a predefined set of one or more attributes of the new optical port by inspecting the predefined signal on the wavelength channel supporting that optical port. Finally, the controller is configured to determine that a client-side optical port and an edge-side optical port are a matching pair of optical ports if discovered sets of attributes of those ports match according to one or more predefined rules. Moreover, the controller is configured to dynamically control the wavelength switch network to re-route the wavelength channel supporting that matching pair of optical ports between those optical ports rather than to the port discovery equipment.

In one or more embodiments, the predefined set of attributes of an optical port includes one or more of a physical layer protocol used by the port, a nominal data rate supported by the optical port, a type of service supported by the optical port, a vendor of the client node or service edge node at which the optical port is deployed, a line code used by the optical port, and an error protection code used by the optical port. Further, in some embodiments, the predefined set also includes a provider of the service supported by the optical port.

In at least one embodiment, the hub node's controller, responsive to the port discovery equipment discovering a predefined set of attributes of a new client-side or edge-side optical port, is configured to determine whether that discovered set of attributes matches any set of attributes previously discovered for an edge-side or client-side optical port, respectively.

In some embodiments, the port discovery equipment is configured, responsive to generally detecting the presence of a predefined signal on wavelength channels routed to the port discovery equipment, to identify on which specific wavelength channel that predefined signal is present. The port discovery equipment performs this identification by iteratively controlling the wavelength switch network to block selected ones of the wavelength channels from being routed to the port discovery equipment and determining whether the predefined signal is still present at the port discovery equipment. As one example, the port discovery equipment is configured in an embodiment to iteratively control the wavelength switch network in a bifurcated fashion with respect to a spectrum of wavelength channels routed to the port discovery equipment.

In at least one embodiment, the port discovery equipment is configured to attempt to prompt the presence of a predefined signal on wavelength channels routed to the port discovery equipment. The port discovery equipment does this by iteratively transmitting an enabling signal on different ones of those wavelength channels. Such enabling signal is transmitted on any given wavelength channel and is configured to enable transmission by an optical port supported by that wavelength channel.

In one or more embodiments, the hub node's controller is configured, responsive to re-routing the wavelength channel supporting a matching pair of optical ports, to generate and send an information signal indicating that one or both of the ports have been properly deployed. In yet other embodiments, the controller is further configured to determine whether the wavelength channel actually supporting a matching pair of optical ports corresponds to a wavelength channel that has been planned for supporting that matching pair, and to generate and send an information signal indicating that determination.

Embodiments herein also include a method performed by a hub node.

Still further, embodiments herein include a node forming part of a WDM optical network. This node, for instance an access subnetwork node or a hub node, comprises a tunable optical port and a controller. The tunable optical port is tunable to any wavelength channel within a predefined set of wavelength channels allocated to the node. The controller is configured, responsive to detecting that a fixed optical port has been communicatively connected to the tunable optical port, to successively tune the tunable optical port to different wavelength channels within the predefined set while monitoring for feedback indicating that the fixed optical port has been properly deployed. If this feedback has not been received after tuning the tunable optical port to each wavelength channel within the predefined set, the controller sends feedback indicating that the fixed optical port has not been properly deployed.

Yet other embodiments herein include a pluggable optical port module for use in a WDM optical network. The module comprises a first optical port and a controller. The first optical port is tunable to any wavelength channel within a predefined set of wavelength channels. The controller is configured, responsive to detecting that a second optical port at an access subnetwork node or a hub node has been connected to the first optical port, to successively tune the first optical port to different wavelength channels within the predefined set while monitoring for feedback from the hub node indicating that the first optical port has been properly deployed. If this feedback has not been received after tuning to each wavelength channel within the predefined set, the controller is configured to signal feedback indicating that the first optical port has not been properly deployed.

Embodiments herein also include corresponding methods performed by the pluggable optical port module and the node.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
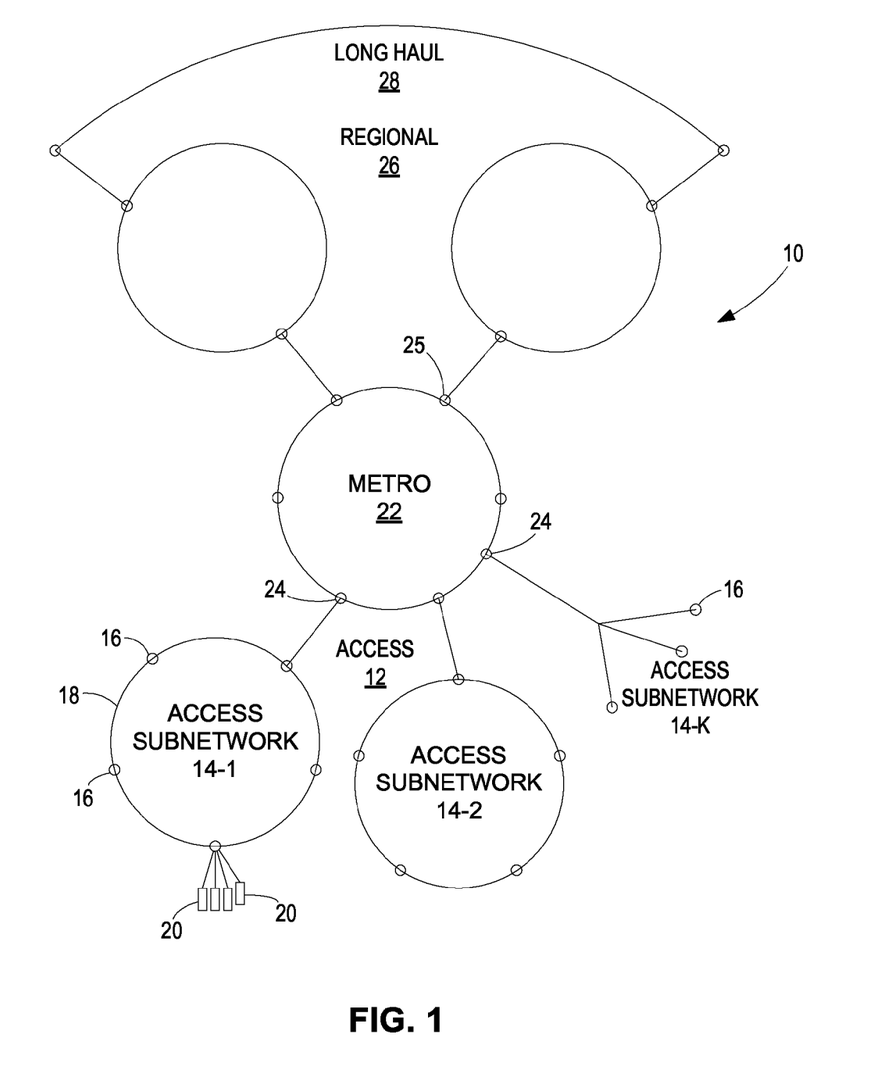
FIG. 1 is a block diagram of a generic tiered architecture for WDM optical networks, according to one or more embodiments.

FIG. 1 illustrates a generic tiered architecture for a wavelength division multiplexed (WDM) optical network 10. The lowest tier shown, tier 1, is an access network 12 comprising a plurality of access subnetworks 14-1, 14-2, . . . 14-K. Each access subnetwork 14-k is formed from multiple access subnetwork nodes 16 interconnected via optical fiber 18 in a ring structure, a tree structure, a bus structure, or the like.

In general, each access subnetwork node 16 communicatively connects to one or more client nodes 20, e.g., a remote radio unit, a base station, a wireless access point, or the like. Deployed at each client node 20 are one or more optical port modules that provide one or more optical ports. In some embodiments, for instance, an optical port module is a hot-pluggable or hot-swappable module that is deployed at a client node 20 by being physically plugged into that client node 20. Examples of such a pluggable module include, for instance, a small form-factor pluggable (SFP) transceiver module, an XFP transceiver module, etc.

Regardless, communicatively connected to one or more of these clients nodes 20, an access subnetwork node 16 aggregates the wavelength channels on which those client nodes 20 transmit uplink traffic and places (i.e., adds) the aggregated wavelength channels onto the access subnetwork 14 it forms. Similarly, the access subnetwork node 16 drops from the access subnetwork 14 the wavelength channels on which downlink traffic is transmitted to those client nodes 20. An access subnetwork node 16 may therefore be appropriately referred to as an access add-drop (AAD) point.

The access network 12 in turn connects to a higher-tiered network; namely, a metro network 22 at tier 2. The metro network 20 is formed from a plurality of interconnected central offices (COs) 24. Each CO 24 aggregates wavelength channels from one or more access subnetworks 14 to which it is connected such that the aggregated wavelength channels are "hubbed" to a hub node 25 in the metro network 22.

The hub node 25 in turn routes wavelength channels from one or more COs 24 to a higher-tiered network called the regional network 26. More specifically, the hub node 25 routes wavelength channels to an appropriate one of multiple service edge nodes (not shown), e.g., a business services edge router, a residential services or mobile services broadband network gateway (BNG), a broadband remote access server (BRAS), etc. The service edge node then routes uplink traffic from the wavelength channels (typically at the packet level) towards an appropriate destination, such as to content servicers, back towards the access networks, to the Internet, etc. Such service edge node routing may entail sending the uplink traffic to the regional network, which operates back at the optical layer. Thus, although omitted from FIG. 1 for simplicity of illustration, the hub node 25 connects to multiple service edge nodes and the service edges nodes in turn connect to the regional transport network 26.

The regional network 26 is also formed from a plurality of interconnected peer network nodes, which place the uplink traffic onto a long haul network 28 at tier 4, for inter-regional transport. Downlink traffic propagates through the networks in an analogous, but opposite, manner.

Figure 2:
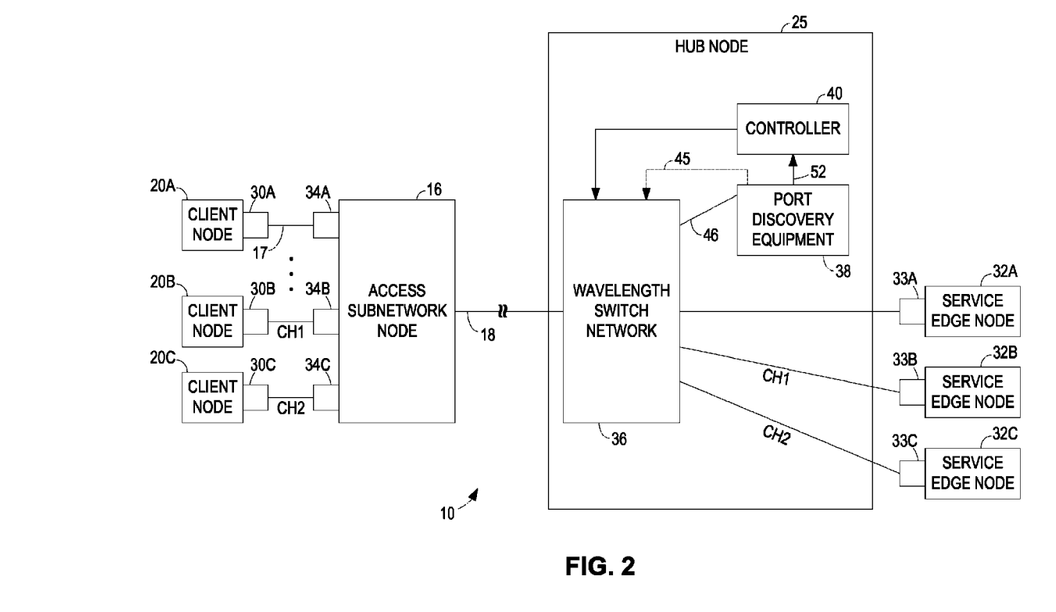
FIG. 2 is a block diagram of a hub node configured according to one or more embodiments, illustrated in the context of client nodes, an access subnetwork node, and service edge nodes.

FIG. 2 illustrates additional details of certain nodes from FIG. 1, in a simplified context, according to one or more embodiments herein. Specifically, FIG. 2 depicts a plurality of different client nodes 20 as client nodes 20A, 20B, and 20C. One or more optical ports 30 (depicted as ports 30A, 30B, and 30C) are deployed at each client node 20. These one or more "client-side" ports 30 are deployed for transmitting uplink traffic towards and receiving downlink traffic from one or more "edge-side" optical ports 33 (depicted as ports 33A, 33B, and 33C) deployed at one or more service edge nodes 32 (depicted as nodes 32A, 32B, and 32C). This traffic is transmitted and received via access subnetwork node 16 and hub node 25.

Any given client-side optical port 30 optically transmits and receives traffic for a particular type of service (e.g., mobile, business, or residential) provided by a particular service provider. Moreover, any given client-side optical port 30 transmits and receives such traffic at a particular nominal data rate (e.g., 1 Gigabit, 10 Gigabits, 2.5 Gigabits, etc.) using a particular physical layer protocol (e.g., Ethernet, Common Public Radio Interface, etc.) and a particular line code (e.g., Carrier-Suppressed Return-to-Zero, Alternate-Phase Return-to-Zero, etc.). This means the uplink traffic transmitted by a given client-side optical port 30 must ultimately be routed to an edge-side optical port 33 that matches in the sense that the edge-side optical port 33 supports the particular type of service to which the uplink traffic pertains, supports the particular service provider providing that type of service, supports the particular physical layer protocol and line code with which the uplink traffic is transmitted, and the like. A client-side optical port 30 and an edge-side optical port 33 that match in this sense are referred to herein as a matching pair of optical ports 30, 33. Conversely, the downlink traffic from an edge-side port 33 must ultimately be routed to a client-side port 30 that matches in an analogous sense.

The hub node 25 in FIG. 2 ensures that traffic will be routed between matching pairs of optical ports 30, 33 in this way. The hub node 25 ensures this by automatically discovering certain attributes of client-side and edge-side optical ports 30, 33 upon their deployment and forming matching pairs of optical ports, 30, 33 based on matching the discovered attributes of those ports. With a matching pair of ports 30, 33 formed, the hub node 25 configures the routing of a wavelength channel over which those ports 30, 33 will eventually transmit and/or receive traffic.

In more detail, the hub node 25 includes a wavelength switch network 36, port discovery equipment 38, and a controller 40. The wavelength switch network 36 is configured to route any wavelength channel that supports a matching pair of client-side and edge-side optical ports 30, 33 between those ports 30, 33. Conversely, the wavelength switch network 36 is configured to route any wavelength channel that does not support such a matching pair to the port discovery equipment 38.

The port discovery equipment 38 is configured to search for new client-side or edge-side optical ports 30, 33. The "new" nature of the ports 30, 33 here refers to the ports 30, 33 having been newly deployed at a client node 20 or service edge node 32. The equipment 38 performs this search by scanning for the presence of a predefined signal on wavelength channels routed to the port discovery equipment 38. When the presence of the predefined signal is detected on a given one of those wavelength channels, the port discovery equipment 38 determines that an optical port 30, 33 has been newly deployed at a client node 20 or service edge node 30 to transmit or receive on that given wavelength channel.

The predefined signal directly or indirectly indicates the newly deployed nature of an optical port 30, 33. The predefined signal in one or more embodiments is a default signal that an optical port 30, 33 transmits on a given wavelength channel upon its deployment at a client node 20 or service edge node 32. In this case, the newly deployed nature of the optical port 30, 33 is indirectly indicated by the mere presence of the predefined signal. As one example of such an embodiment, the predefined signal is a sequence of one or more empty frames that lack a traffic payload. In other embodiments, the predefined signal is additionally or alternatively characterized as a control signal that an optical port 30, 33 transmits on a given wavelength channel upon its deployment at a client node 20 or service edge node 32. This control signal may directly indicate the newly deployed nature of the optical port 30, 33, such as with a sequence of one or more frames that have a particular format or that carry a particular control payload.

Regardless of the particular implementation of the port discovery's search or the predefined signal, the port discovery equipment 38 is further configured, responsive to finding a new optical port 30, 33, to discover a predefined set of one or more attributes of that port 30, 33. The port discovery equipment 38 discovers this predefined set of attributes by inspecting the predefined signal on the wavelength channel supporting the port 30, 33.

In one or more embodiments, the predefined set of attributes of a new port 30, 33 includes a physical layer protocol used by the port. Additionally or alternatively, the predefined set of attributes of an optical port 30, 33 includes a nominal data rate supported by the optical port 30, 33, a type of service supported by the optical port 30, 33, a line code used by the optical port 30, 33, and/or an error protection (e.g., detecting and/or correcting) code used by the optical port 30, 33. In yet other embodiments, the predefined set of attributes of an optical port 30, 33 additionally or alternatively includes a vendor of the client node 20 or service edge node 32 at which the optical port 30, 33 is deployed and/or a provider of the service supported by the optical port 30, 33. Regardless of the particular attributes in the predefined set, though, the set's attributes collectively describe or characterize the optical port 30, 33 in terms of the port's capabilities, configuration, and/or use.

Appropriately, therefore, the hub node's controller 40 is configured to determine that a client-side optical port 30 and an edge-side optical port 33 are a matching pair of optical ports 30, 33 if discovered sets of attributes of those ports 30, 33 match, according to one or more predefined rules. The predefined rules, for instance, specify the extent to which discovered sets of attributes must be the same in order to be considered as matching sets (e.g., whether all attributes in the sets must match, or whether the matching of a certain subset of the attributes suffices for the sets to be considered matching). The predefined rules may also specify conditions for certain attributes themselves to be considered as matching (e.g., whether the attributes must be identical to one another, whether the attributes must be complementary of one another, etc.).

In at least some embodiments, the controller 40 performs this determination as to whether optical ports 30, 33 are a matching pair, responsive to the port discovery equipment 38 finding a newly deployed client-side or edge-side optical port 30, 33 and discovering a predefined set of attributes of that port 30, 33. In this case, the controller 40 determines whether that recently discovered set of attributes matches any set of attributes previously discovered for an edge-side or client-side optical port 33, 30, respectively. That is, upon discovery of a client-side port 30, the controller 40 searches for a matching edge-side port 33 that has been previously discovered. And upon discovery of an edge-side port 33, the controller 40 searches for a matching client-side port 30 that has been previously discovered. If no match is found, the controller 40 stores or otherwise remembers the discovered set of attributes for subsequent matching determinations.

Regardless, upon determining that certain client-side and edge-side optical ports 30, 33 are a matching pair, the controller 40 dynamically controls the wavelength switch network 36 to re-route the wavelength channel supporting that matching pair. Specifically, the wavelength switch network 36 is controlled to switch from routing this wavelength channel to the port discovery equipment 38 to routing the wavelength channel between the ports 30, 33 of the matching pair. This way, traffic subsequently transmitted over the wavelength channel will be routed between the ports 30, 33 rather than to the port discovery equipment 38.

Consider a simple example shown in the context of FIG. 2. Wavelength channel 1 (denoted CH1) supports client-side optical port 30B. Port 30B has previously been deployed at client node 20B, discovered by the hub node 25, and determined by the hub node 25 as forming a matching pair with port 33B deployed at service edge node 32B. The wavelength switch network 36 therefore routes channel 1 between edge-side port 30B and client-side port 33B. Similarly, wavelength channel 2 (denoted CH2) supports client-side optical port 30C. Port 30C has previously been deployed at client node 20C, discovered by the hub node 25, and determined by the hub node 25 as forming a matching pair with port 33C deployed at service edge node 32C. The wavelength switch network 36 therefore routes channel 2 between edge-side port 30C and client-side port 33C. By contrast, wavelength channels 3-6 do not yet support a matching pair of ports, meaning that the wavelength switch network 36 routes those channels to the port discovery equipment 38. In an effort to detect a new optical port, the port discovery equipment 38 scans for the presence of a predefined signal on these wavelength channels 3-6.

Assume now that optical port 33A is newly deployed at service edge node 32A (e.g., by being plugged into that node 32A). Upon such deployment, port 33A begins to transmit a predefined signal over wavelength channel 3. Responsive to detecting the presence of the predefined signal on wavelength channel 3, the port discovery equipment 38 discovers a predefined set of one or more attributes of port 33A by inspecting that predefined signal. For instance, this discovered set of attributes may include the port being a broadband network gateway (BNG) port that supports a 1 Gigabit data rate for a fixed residential broadband service provided by service provider Y. Responsive to such discovery, the controller 40 searches for a client-side optical port 30 that has a matching set of attributes. Assuming in this example that no such match exists yet, the controller 40 stores or otherwise remembers the discovered set of attributes for subsequent matching determinations.

In this regard, optical port 30A is later newly deployed at client node 20A (e.g., by being plugged into that client node 20A). Upon such deployment, port 30A begins to transmit a predefined signal over wavelength channel 3. Responsive to detecting the presence of the predefined signal on wavelength channel 3, the port discovery equipment 38 discovers a predefined set of one or more attributes of port 30A by inspecting that predefined signal. For instance, this predefined set of attributes of port 30A may include the port being a digital subscriber line access multiplexer (DSLAM) port that supports a 1 Gigabit data rate for a fixed residential broadband service provided by service provider Y. Responsive to such discovery, the controller 40 searches for an edge-side optical port 33 that has a matching set of attributes. The controller determines in this regard that client-side port 30A and edge-side port 33A form a matching pair, since their discovered sets of attributes match. Indeed, the ports 30A, 33A support the same data rate for the same type of service and for the same service provider, are compatible in terms of being a DSLAM port and a BNG port, etc. The controller 40 therefore controls the wavelength switch network 36 to re-route wavelength channel 3 from being routed to the port discovery equipment 38 to being routed between ports 30A and 33A.

For ease of illustration, this example has omitted certain details about exactly how the port discovery equipment 38 finds a new optical port 30, 33 and discovers the predefined set of one or more attributes of the port 30, 33 by inspecting the predefined signal. In this regard, the predefined signal in some embodiments directly or indirectly indicates one or more of these attributes in the predefined set. As just one example, the predefined signal may be a sequence of one or more frames that are empty in terms of carrying a payload but that have frame headers carrying information indicative of one or more of the attributes in the predefined set. Such header information includes, in at least one embodiment, an identifier and/or version number of a physical layer protocol used by the port 30, 33. In another embodiment, the header information includes an identifier or address of the optical port 30, 33, or an identifier or address of the client node 20 or service edge node 32 at which the port 30, 33 is deployed. This identifier or address is indicative, for instance, of a vendor of the client node 20 or service edge node 32 and/or a provider of the service supported by the optical port 30, 33.

Figure 3A:
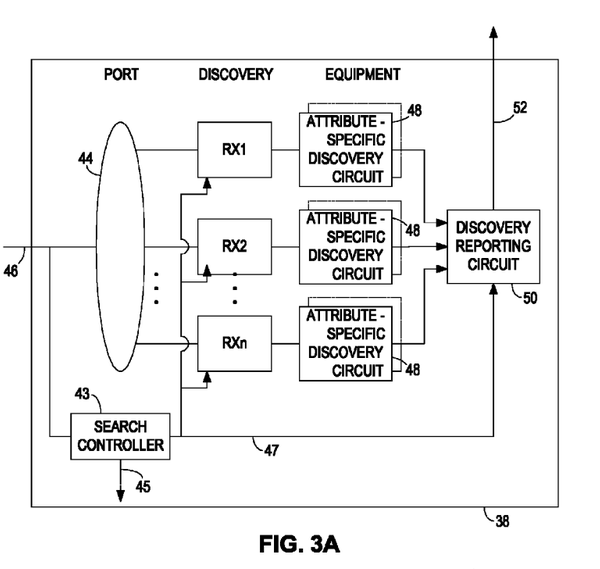
FIG. 3A is a block diagram of port discovery equipment according to one or more embodiments.
Figure 3B:
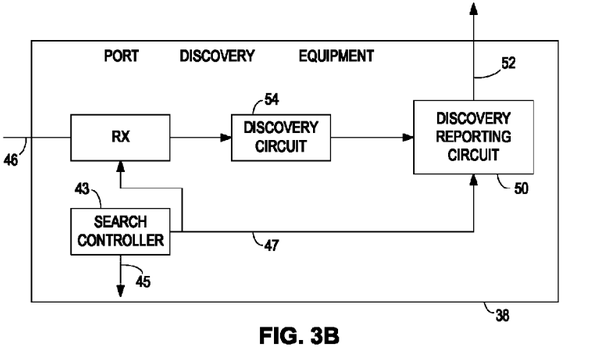
FIG. 3B is a block diagram of port discovery equipment according to one or more other embodiments.

FIGS. 3A and 3B depict additional details of the port discovery equipment 38 according to different embodiments for find a new optical port 30, 33 and discovering the port's predefined set of attributes. As shown in FIG. 3A, the port discovery equipment 38 includes a search controller 43 that is configured to control the search for a new client-side or edge-side optical port 30, 33. The search controller 43 receives the WDM signal 46 (comprising the wavelength channels routed by the wavelength switch network 36 to the port discovery equipment 38) and detects a new optical port 30, 33 transmitting on a given one of those wavelength channels. The search controller 43, in at least some embodiments and as explained in further detail later, performs this search in cooperation with and/or by controlling the wavelength switch network 36, e.g., via switch control signal 45. Responsive to finding a new port 30, 33 and determining which wavelength channel is supporting that port 30, 33, the search controller 43 generates a discovery control signal 47 indicating that the new port's set of attributes can be discovered by inspecting the predefined signal on that wavelength channel.

In the embodiment of FIG. 3A, such discovery involves an optical splitter 44, a plurality of different optical receivers RX1-RXN (e.g., as parts of respective optical transceivers), and a corresponding plurality of different sets of one or more attribute-specific discovery circuits 48. The splitter 44 is configured to optically split the WDM signal 46 (so that the signal 46 is fed in parallel to the different optical receivers RX1-RXN. These receivers RX1-RXN each receive the discovery control signal 47 from the search controller 45 indicating that discovery is to be performed by inspecting a predefined signal on a particular wavelength channel. Different ones of these optical receivers RX1-RXN are therefore configured to receive the predefined signal transmitted on the indicated wavelength channel according to different physical layer protocols.

A set of one or more attribute-specific discovery circuits 48 is connected in the electrical domain to each of the optical receivers RX1-RXN. Upon reception of the predefined signal by one of the receivers RX1-RXN according to a particular physical layer protocol, the corresponding set of attribute-specific discovery circuits 48 inspects that predefined signal in order to identify the predefined set of attributes of the new port 30, 33. For example, one of the attribute-specific discovery circuits 48 inspects the predefined signal to identify the physical layer protocol used by the optical port 30, 33 (and the corresponding receiver RX), another attribute-specific discovery circuit 48 identifies a type of service supported by the optical port 30, 33, another attribute-specific discovery circuit 48 identifies a provider of the service supported by the optical port 30, 33, etc. Different attribute-specific discovery circuits 48 in this regard may for instance be configured to inspect different protocol levels and/or different fields of protocol headers associated with the predefined signal in order to detect, deduce, or otherwise determine different attributes of the port 30, 33. The attribute-specific discovery circuits 48 in a set of discovery circuits 48 connected to any given one of the receivers RX1-RXN may discover different port attributes in parallel or in series, depending on for instance whether discovery of certain attributes is a prerequisite to discovery of other attributes.

Upon discovery of the predefined set of attributes, that set of attributes is provided to a discovery reporting circuit 50. The discovery reporting circuit 50 is also provided with the discovery control signal 47 indicating the wavelength channel over which discovery has been performed. Based on this information, the discovery reporting circuit 50 generates and sends a report 52 to the hub node's controller 40 indicating that a new port 30, 33 has been found on a particular wavelength channel and indicating the discovered set of attributes of that new port 30, 33.

Although FIG. 3A has shown discovery being performed in parallel by different optical receivers and different sets of attribute-specific discovery circuits, discovery in other embodiments is performed in more of a serial fashion. FIG. 3B illustrates one example. As shown in FIG. 3B, a single optical receiver RX is configured to sequentially receive the predefined signal according to different physical layer protocols. This functionally amounts to splitting in the electrical domain rather than in the optical domain as in FIG. 3A. Similarly, a single discovery circuit 54 is configured to inspect the predefined signal in order to identify the predefined set of attributes of the new port 30, 33.

Figure 4:
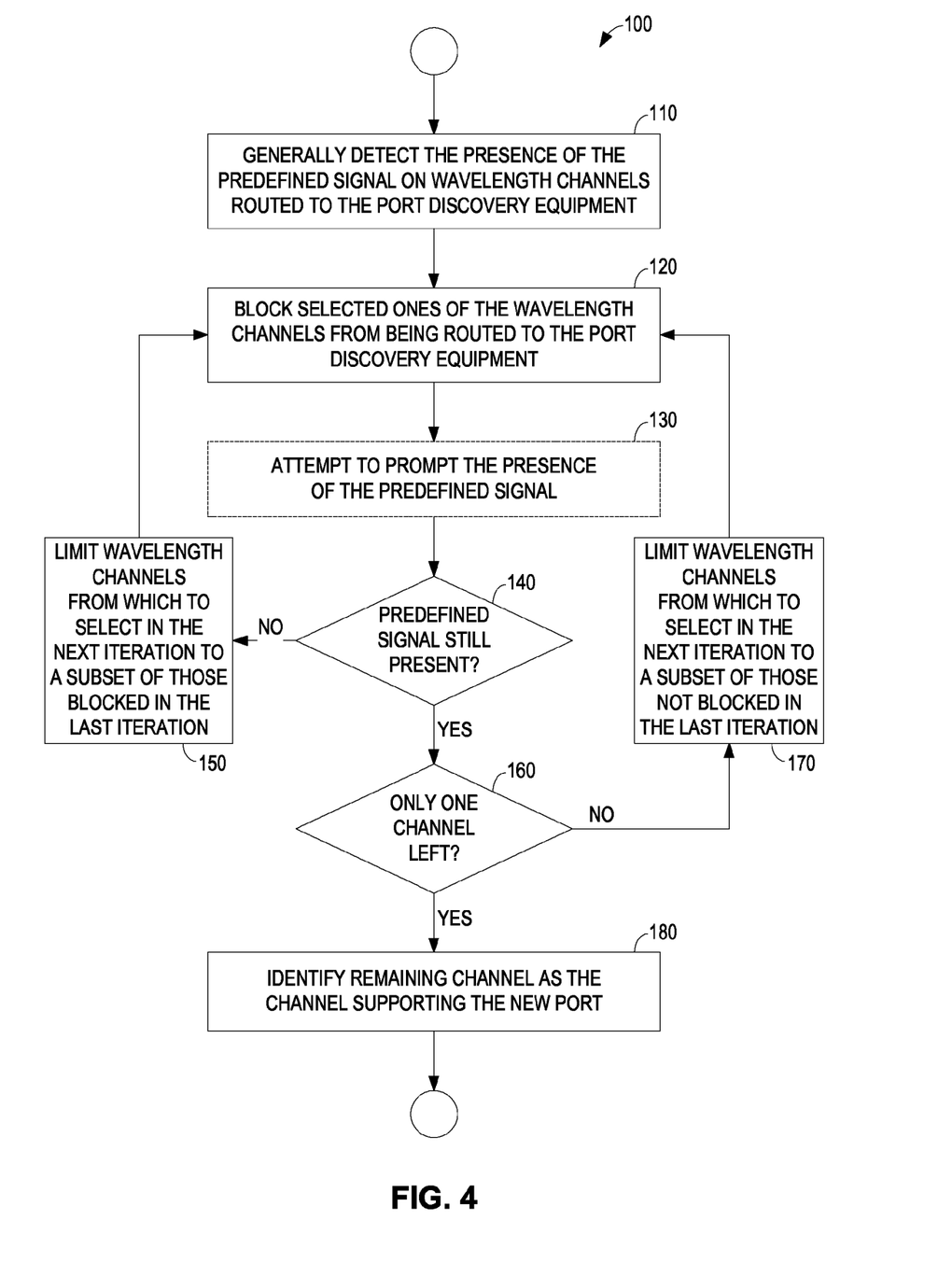
FIG. 4 is a logic flow diagram of processing performed by a hub node for searching for a new optical port.

Just as discovery may proceed according to the approach of FIG. 3A or 3B, the search performed by the port discovery equipment 38 (or more particularly by the search controller 43) may likewise proceed according to any number of approaches. In some embodiments, for example, searching entails in an initial stage generally detecting the presence of the predefined signal on wavelength channels routed to the port discovery equipment 38. Such general detection may be performed for instance by an optical power monitor (not shown) implemented by the search controller 43. Regardless, searching then proceeds in a subsequent stage with identifying on which specific wavelength channel that predefined signal is present. This subsequent stage involves an iterative process by which the port discovery equipment 38 iteratively controls the wavelength switch network 36 to block selected ones of the wavelength channels from being routed to the port discovery equipment 38 and determines whether the predefined signal is still present at the port discovery equipment 38. Thus, each iteration of the search attempts to detect the presence of the predefined signal within a smaller spectrum of the wavelength channels routed to the port discovery equipment 38, so as to eventually deduce that the predefined signal is present on a particular one of those channels FIG. 4 illustrates search processing 100 according to one such embodiment. As shown in FIG. 4, search processing 100 entails generally detecting the presence of the predefined signal on wavelength channels routed to the port discovery equipment 38 (Block 110). Processing then includes, in a first iteration, blocking selected ones of the wavelength channels from being routed to the port discovery equipment 38 (Block 120). Next, processing involves determining whether the predefined signal is still present at the port discovery equipment 38 after such blocking (Block 140). If not (NO at Block 140), then the predefined signal must have been present on one of the blocked wavelength channels. Processing In this case includes limiting the wavelength channels from which to select in the next iteration to a subset of those blocked in the last iteration (Block 150). If so (YES at Block 140), though, then the search has narrowed the number of wavelength channels on which the predefined signal could be present. If this number of wavelength channels is down to one channel (YES at Block 160), then processing entails identifying that remaining wavelength channel as the channel supporting the new optical port 30, 33. Otherwise, if there are more than one wavelength channels remaining (NO at Block 160), then processing includes limiting the wavelength channels from which to select in the next iteration to a subset of those not blocked in the last iteration (Block 170).

Note that, in at least some embodiments, a new optical port 30, 33 only transmits the predefined signal upon receiving a particular enabling signal that enables the port's transmitter. In this case, the port discovery equipment 38 is configured as part of search processing 100 to attempt to prompt the presence of the predefined signal on wavelength channels routed to the port discovery equipment 38, e.g., in a round-robin fashion. As shown by Block 130 of FIG. 4, for instance, this attempt is made iteratively for non-blocked wavelength channels. Moreover, such attempt entails the port discovery equipment 38 iteratively transmitting an enabling signal on different ones of the non-blocked wavelength channels, to enable transmission of the predefined signal by an optical port 30, 33 supported by that wavelength channel.

Figure 5:
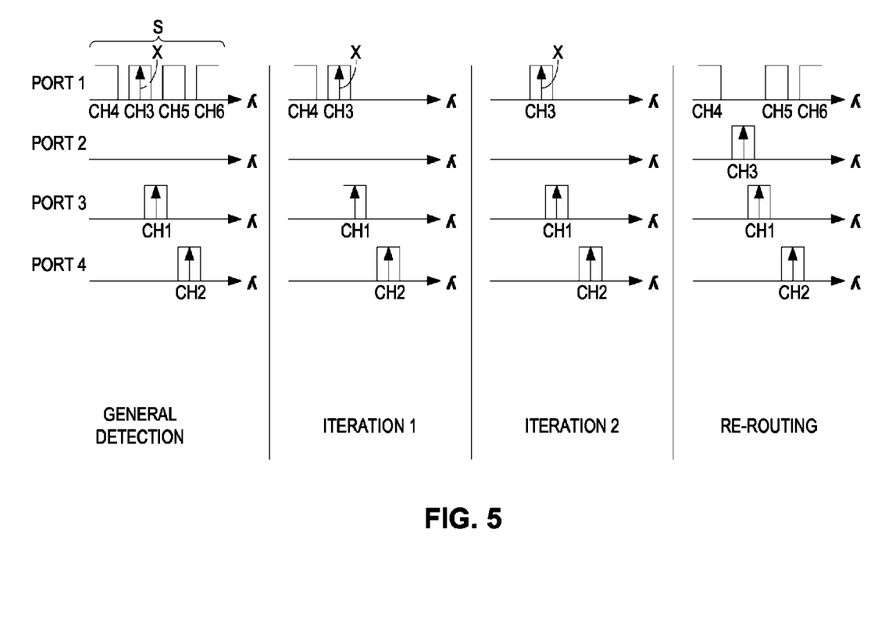
FIG. 5 illustrates an example of a bifurcated search for a new optical port according to one or more embodiments.

Also note that the search for a new optical port 30, 33 may employ any number of possible search algorithms. In some embodiments, for instance, the search performed is a bifurcated search. In this case, the port discovery equipment 38 is configured to iteratively control the wavelength switch network 36 in a bifurcated fashion with respect to a spectrum of wavelength channels routed to the port discovery equipment 38. FIG. 5 illustrates an example.

As shown in FIG. 5, the wavelength switch network 36 has 4 ports, labeled as Ports 1-4. Ports 2-4 are ports towards edge-side ports 33, while Port 1 is a port towards the port discovery equipment 38. Assume that the wavelength switch network 36 is configured to route a first wavelength channel 1 to port 3 towards a particular edge-side port 33, and to route a second wavelength channel 2 to Port 4 towards a different edge-side port 33. The wavelength switch network 36 is initially configured to route other wavelength channels within a nominal spectrum S to Port 1, towards the port discovery equipment 38. With the nominal spectrum S including additional wavelength channels 3-6, this means that those wavelength channels 3-6 are routed towards the port discovery equipment 38.

Assume that at Block 110 of search processing 100 the presence of a predefined signal x is generally detected within the nominal spectrum S. Although FIG. 5 shows that this signal is indeed present on wavelength channel 3 within the spectrum S, the general detection of the signal x at this stage of the search is not performed with that fine of granularity. Rather, responsive to this general detection, search processing 100 then proceeds with performing an iterative, bifurcated search for over which specific wavelength channel that signal x is present.

In the first iteration of the search, Block 120 of search processing 100 selects the right half of the nominal spectrum S to be blocked from routing to the port discovery equipment 38. In this example, the port discovery equipment 38 detects that the signal x is still present despite this blocking (YES at Block 140). Accordingly, Block 170 of search processing 100 limits the wavelength channels from which to select in the second iteration to a subset of those not blocked in the first iteration (namely, to a subset of the left half of the nominal spectrum S). As shown for the second iteration, Block 120 of search processing selects the left half of this subset to be blocked from routing to the port discovery equipment 38. Again, the port discovery equipment 38 detects that the signal x is still present despite this blocking (YES at Block 140). Moreover, since only channel 3 remains among the non-blocked channels, the port discovery equipment 38 identifies channel 3 as being the channel that supports the new port 30, 33. Responsive to the port discovery equipment's conclusion in this regard, and based on the discovery of the port's predefined set of attributes, the hub node's controller 40 reroutes wavelength channel 3 to Port 2 of the wavelength switch network 36.

Such a bifurcated search proves advantageous for appropriately handling deployment of multiple new ports at the same time, since the search finds new ports one by one. Moreover, the bifurcated search finds a new optical port 30, 33 quickly. Indeed, the port discovery equipment 38 need only perform $\log 2^N$ search iterations to find a new optical port 30, 33 in the worst case, where N is the number of expected wavelength channels in the nominal spectrum routed to the port discovery equipment 38. Where N=360, for example, only 9 iterations need to be performed. Assuming a 100 ms switching time of the wavelength switch network 36, and assuming the signal detect event of the port discovery equipment 38 to be sub ms, the total search for a new optical port 30, 33 is close to 1s. Of course, discovery of the new port's set of attributes takes additional time, but the maximum time for search and discovery in at some embodiments is still in the seconds range.

The quick nature of the bifurcated search also proves advantageous for "sharing" the port discovery equipment 38 for the discovery of multiple new optical ports 30, 33 in the network 10. Indeed, in at least some embodiments, the port discovery equipment is centralized in the sense that it is shared both geographically and among all possible new optical ports.

Figure 6:
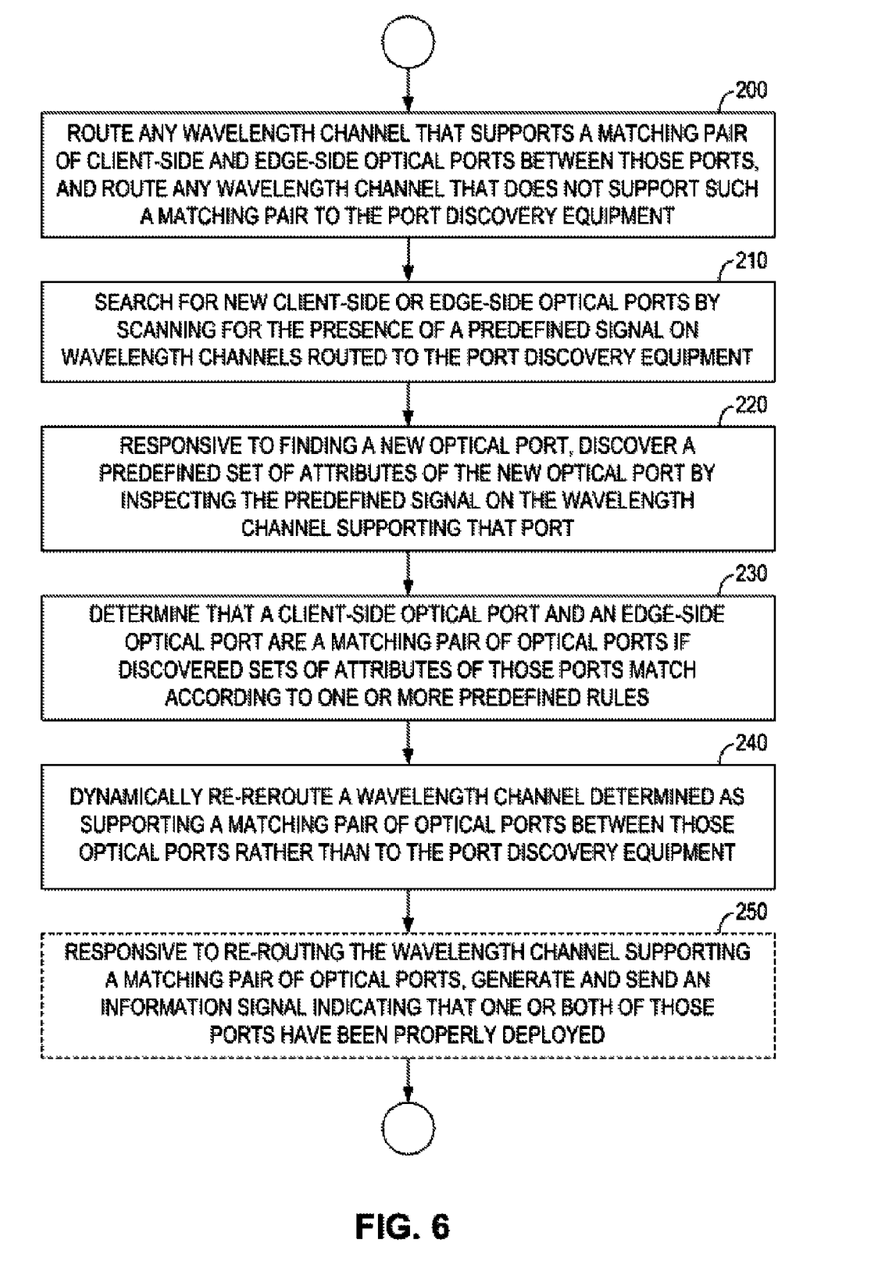
FIG. 6 is a logic flow diagram of processing performed by a hub node according to one or more embodiments.

In view of the various modifications and alternatives discussed above, those skilled in the art will appreciate that the hub node 25 generally performs the processing shown in FIG. 6 for automatically discovering at least one of new client-side optical ports 30 at client nodes 20 and new edge-side optical ports 33 at service edge nodes 32. As shown in FIG. 6, such processing entails routing any wavelength channel that supports a matching pair of client-side and edge-side optical ports 30, 33 between those ports, and routing any wavelength channel that does not support such a matching pair to port discovery equipment 38 at the hub node 25 (Block 200). Processing further includes searching for new client-side or edge-side optical ports 30, 33 by scanning for the presence of a predefined signal on wavelength channels routed to the port discovery equipment 38 (Block 210). Such searching may include the search processing 100 shown in FIG. 4. Regardless, processing at the hub node 25 also entails, responsive to finding a new optical port, automatically discovering a predefined set of one or more attributes of the new optical port by inspecting the predefined signal on the wavelength channel supporting that optical port (Block 220). Processing further involves determining that a client-side optical port 30 and an edge-side optical port 33 are a matching pair of optical ports if discovered sets of attributes of those ports match according to one or more predefined rules (Block 230). Finally, processing entails dynamically re-routing a wavelength channel determined as supporting a matching pair of optical ports 30, 33 between those optical ports rather than to the port discovery equipment 38 (Block 240).

As shown in FIG. 6, processing at the hub node 25 in some embodiments further includes, responsive to re-routing the wavelength channel supporting a matching pair of optical ports 30, 33, generating and sending an information signal indicating that one or both of those ports have been properly deployed. As one example, this information signal may be returned to one or both of the ports themselves as helpful feedback (e.g., a link OK signal) to a service technician deploying one or both of the ports as new ports. Alternatively or additionally, this information signal may be sent to a designated or provided address (e.g., a phone number or email address) associated with the service technician, e.g., as a text message, voicemail, or the like.

Especially with this information signal provided as deployment feedback, the hub node 25 facilitates proper deployment with minimal burden on a service technician. The service technician, for instance, need not be burdened with certain details about how to properly deploy a new client-side or edge-side optical port 30, 33. Moreover, the hub node 25 helps correct improper port deployment before security, privacy, technical, or other problems with that deployment arise.

For example, although in some embodiments there are no constraints on over which wavelength channel a client-side or edge-side optical port 30, 33 can transmit and receive, in other embodiments technological constraints are present. For instance, in one or more embodiments the optical port 30, 33 is itself technologically constrained to transmitting or receiving over a particular fixed wavelength channel because the port cannot be tuned to different wavelength channels. Additionally or alternatively, similar technological constraints are present in one or more embodiments at an access subnetwork node 16 via which a client-side optical port 30 transmits and receives. For instance, in one or more embodiments each subnewtork optical port 34 shown in FIG. 2 (e.g., port 34A, 34B, or 34C) to which a client-side optical port 30 communicatively connects (e.g., via optic fiber 17) to the access subnetwork node 16 is similarly constrained to transmitting or receiving over a fixed subset of one or more wavelength channels. That is, different subnetwork optical ports 34 of the access subnetwork node 16 are technologically constrained to transmitting or receiving over different subset of one or more wavelength channels. As one example of this technological constraint, the access subnetwork node 16 may include one or more components that are passive or fixed, as in for instance U.S. patent application Ser. No. 13/484,115, the entire contents of which are incorporated herein by reference. Thus, if a client-side port 30 is deployed so as to connect to a particular subnetwork port 34, but the client-side port's fixed wavelength channel is not included in the subnetwork port's subset of wavelength channels, communication cannot occur between those ports.

Figure 7:
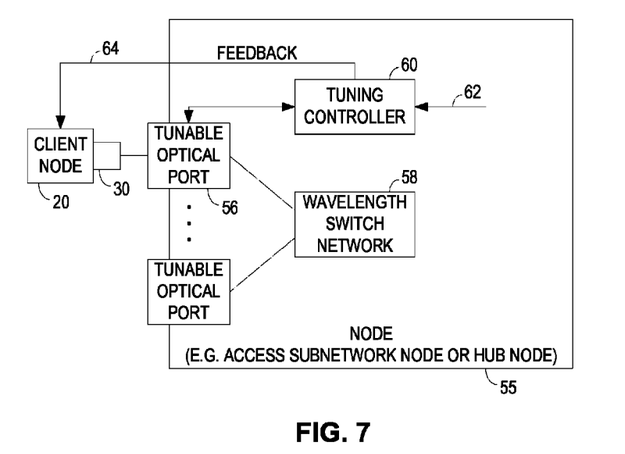
FIG. 7 is a block diagram of a node forming part of a wavelength division multiplexed (WDM) optical network according to one or more embodiments.

Especially in the face of such technological constraints, the risk that a service technician will improperly deploy a client-side or edge-side optical port 30, 33 proves real and not insignificant. Feedback from the hub node 25 indicating whether or not deployment is proper helps eliminate or reduce this risk, and helps correct the consequence of improper deployment. Some embodiments additionally or alternatively employ such feedback from the hub node 25 in an attempt to correct what would otherwise amount to improper deployment and/or to facilitate flexible deployment. FIG. 7 illustrates one such embodiment, including a node that employs feedback from the hub node 25.

As shown in FIG. 7, a node 55 may be an access subnetwork node 16 or a hub node 25. The node 55 includes one or more tunable optical ports 56, a wavelength switch network 58, and a tuning controller 60. A tunable optical port 56 is tunable to any wavelength channel within a predefined set of wavelength channels allocated to the node 55. The wavelength switch network 58 is configured to add and drop wavelength channels from the node via the ports. The tuning controller 60 is configured to detect, e.g., using an optical power monitor, that a fixed optical port (shown in FIG. 7 as a client-side port 30) has been connected to a tunable optical port 56.

Responsive to this detection, the controller 60 is configured to successively tune the tunable optical port 56 to different wavelength channels within the predefined set while monitoring for feedback 62, e.g., from the controller 40 of the hub node 25, indicating that the fixed optical port has been properly deployed. That is, the controller 60 exploits the tunability of the optical port 56 to correct what might otherwise be improper deployment of the fixed optical port and/or to prevent the fixed port from having to be deployed in a particular manner. Towards this end, if feedback 62 has not been received after tuning the tunable optical port 56 to each wavelength channel within the predefined set, the controller is configured to send feedback 64 indicating that the fixed optical port has not been properly deployed. Such feedback 64 may be a local indication to the service technician, prompting a red light or other indicator of improper deployment. In at least some embodiments, the controller 60 also sends an error message to the hub node's controller 40 indicating improper deployment.

Figure 8:
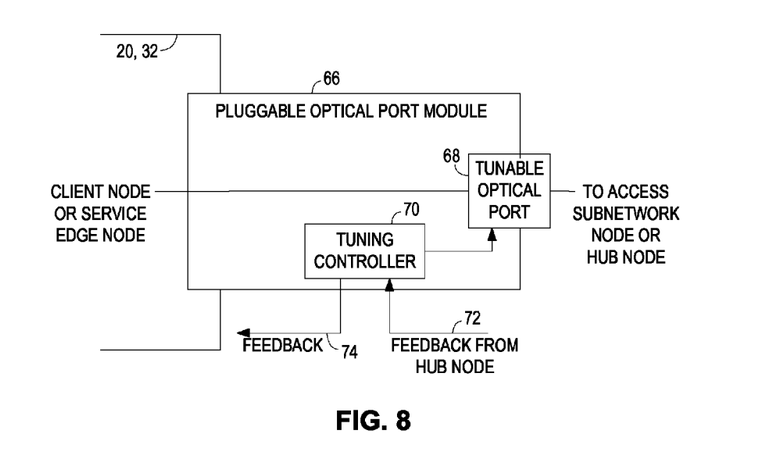
FIG. 8 is a block diagram of a pluggable optical port module according to one or more embodiments.

FIG. 8 by contrast depicts an embodiment of a pluggable optical port module that employs feedback from the hub node 25. The pluggable optical port module 66 includes a first optical port 68 that is tunable to any wavelength channel within a predefined set of wavelength channels. The module 66 also includes a tuning controller 66 that is configured to detect that a second optical port at an access subnetwork node 16 or a hub node 25 has been connected to the first optical port 68. Responsive to this detection, the controller 66 is configured to successively tune the first optical port 68 to different wavelength channels within the predefined set while monitoring for feedback 72 from the hub node 25 indicating that the first optical port 68 has been properly deployed. In at least some embodiments, the controller 66 monitors for this feedback 72 for a predefined amount of time corresponding to the maximum discovery time of the hub node 25 (e.g., a few seconds). Regardless, if this feedback 72 has not been received after tuning to each wavelength channel within the predefined set, the tuning controller 70 is configured to signal feedback 74 indicating that the first optical port 68 has not been properly deployed. Again, such feedback 74 may be a local indication to the service technician, prompting a red light or other indicator of improper deployment. As an example, if the port 68 comprises a finely tuned laser with 200 possible wavelength channels (full c-band at 25 GHz spacing) and assuming the maximum discovery time is 2s, the flexible discovery process will at most take 400 seconds, or close to 7 minutes. This is still acceptable for a service technician waiting for a 'green' light indicating successful installation.

Contrasted with the technological constraints addressed above, in one or more embodiments the wavelength channel over which a client-side or edge-side optical port 30, 33 can transmit and receive is contractually or otherwise legally constrained. In some embodiments, for instance, the particular service provider providing the particular service to which the traffic transmitted and received by an optical port 30, 33 pertains is contractually bound to using one or more particular wavelength channels for that particular service. With contractual obligations having been put in place, which wavelength channels will support respective matching pairs of optical ports 30, 33 may be planned in advance of port deployment.

In this case, the hub node's controller 40 in one or more embodiments is further configured to determine whether a wavelength channel actually supporting a matching pair of optical ports 30, 33 corresponds to the wavelength channel that has been planned for supporting that matching pair. The controller 40 is then configured to generate and send an information signal indicating that determination. This way, a service technician is informed when actual port deployment differs from planned port deployment, prompting corrective action if necessary.

In at least some embodiments, the hub node 25 performs automatic port discovery and wavelength re-routing irrespective of planned port deployment, but simply provides a notification when actual deployment differs from planned deployment. In other embodiments, though, the hub node 25 limits automatic port discovery and wavelength re-routing to only planned ports. For example, searches for a new optical port will ignore unplanned ports that are not supported by planned wavelength channels.

Of course, in embodiments where port deployment is not planned, the hub node's automatic port discovery and wavelength re-routing may be exploited in order to dynamically optimize the network's wavelength channel use. These embodiments prove especially advantageous for short-lived inter-datacenter connections.

Those skilled in the art will appreciate that a node (e.g., hub node) as used herein refers to a functional entity that is implemented on one or more physical hosts or devices. In this regard, those skilled in the art will also appreciate that the various "circuits" described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Those skilled in the art will appreciate that no particular type of wavelength switch network 36 is required for use of embodiments herein. However, in at least some embodiments, a wavelength switch network at an access subnetwork node 16 and/or at the hub node 25 comprises a single wavelength selective switch (WSS) as described in U.S. patent application Ser. No. 13/420,416, the entire contents of which is incorporated herein by reference. In this case, the port discovery equipment 38 is connected to a single port of the hub node's WSS.

Still further, those skilled in the art will understand that no particular type of WDM is required to practice the above embodiments. Thus, the embodiments may employ coarse WDM or dense WDM. The embodiments may even be used in the context of a WDM passive optical network (WDM-PON), with or without inverse return to zero/return to zero (IRZ/RZ) wavelength re-use. In one embodiment, for instance, the embodiments utilize 25 GHz channel spacing in both C and L bands, allowing for up to 360 wavelength channels per fiber, assuming the 9 THz spectrum resulting from the 1530-1600 nm band. Another embodiment utilizes up to 100 GHz channel spacing.

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A hub node in a wavelength division multiplexed (WDM) optical network configured to automatically discover at least one of new client-side optical ports at client nodes and new edge-side optical ports at service edge nodes, the hub node comprising:
- a wavelength switch network configured to route any wavelength channel that supports a matching pair of client-side and edge-side optical ports between those ports, and to route any wavelength channel that does not support such a matching pair to port discovery equipment at the hub node;
- wherein the port discovery equipment is configured to:
  - search for new client-side or edge-side optical ports by scanning for the presence of a predefined signal on wavelength channels routed to the port discovery equipment; and
  - responsive to finding a new optical port, automatically discover a predefined set of one or more attributes of the new optical port by inspecting the predefined signal on the wavelength channel supporting that optical port; and
- a controller configured to determine that a client-side optical port and an edge-side optical port are a matching pair of optical ports if discovered sets of attributes of those ports match according to one or more predefined rules, and to dynamically control the wavelength switch network to re-route the wavelength channel supporting that matching pair of optical ports between those optical ports rather than to the port discovery equipment.

2. The hub node of claim 1, wherein the predefined set of attributes of an optical port includes one or more of:
- a physical layer protocol used by the optical port;
- a nominal data rate supported by the optical port;
- a type of service supported by the optical port;
- a vendor of the client node or service edge node at which the optical port is deployed;
- a line code used by the optical port; and
- an error protection code used by the optical port.

3. The hub node of claim 2, wherein the predefined set of attributes of an optical port further includes a provider of the service supported by the optical port.

4. The hub node of claim 1, wherein, responsive to the port discovery equipment discovering a predefined set of attributes of a new client-side or edge-side optical port, the controller is configured to determine whether that discovered set of attributes matches any set of attributes previously discovered for an edge-side or client-side optical port, respectively.

5. The hub node of claim 1, wherein the port discovery equipment is configured, responsive to generally detecting the presence of a predefined signal on wavelength channels routed to the port discovery equipment, to identify on which specific wavelength channel that predefined signal is present, by iteratively controlling the wavelength switch network to block selected ones of the wavelength channels from being routed to the port discovery equipment and determining whether the predefined signal is still present at the port discovery equipment.

6. The hub node of claim 5, wherein the port discovery equipment is configured to iteratively control the wavelength switch network in a bifurcated fashion with respect to a spectrum of wavelength channels routed to the port discovery equipment.

7. The hub node of claim 1, wherein the port discovery equipment is configured to attempt to prompt the presence of a predefined signal on wavelength channels routed to the port discovery equipment, by iteratively transmitting an enabling signal on different ones of those wavelength channels, the enabling signal transmitted on any given wavelength channel configured to enable transmission by an optical port supported by that wavelength channel.

8. The hub node of claim 1, wherein the controller is further configured, responsive to re-routing the wavelength channel supporting a matching pair of optical ports, to generate and send an information signal indicating that one or both of the ports have been properly deployed.

9. The hub node of claim 1, wherein the controller is further configured to determine whether the wavelength channel actually supporting a matching pair of optical ports corresponds to a wavelength channel that has been planned for supporting that matching pair, and to generate and send an information signal indicating that determination.

10. A method implemented by a hub node in a wavelength division multiplexed (WDM) for automatically discovering at least one of new client-side optical ports at client nodes and new edge-side optical ports at service edge nodes, the method comprising:
- routing any wavelength channel that supports a matching pair of client-side and edge-side optical ports between those ports, and routing any wavelength channel that does not support such a matching pair to port discovery equipment at the hub node;
- searching for new client-side or edge-side optical ports by scanning for the presence of a predefined signal on wavelength channels routed to the port discovery equipment;
- responsive to finding a new optical port, automatically discovering a predefined set of one or more attributes of the new optical port by inspecting the predefined signal on the wavelength channel supporting that optical port;
- determining that a client-side optical port and an edge-side optical port are a matching pair of optical ports if discovered sets of attributes of those ports match according to one or more predefined rules; and
- dynamically re-routing a wavelength channel determined as supporting a matching pair of optical ports between those optical ports rather than to the port discovery equipment.

11. The method of claim 10, wherein the predefined set of attributes of an optical port includes one or more of:
- a physical layer protocol used by the optical port;
- a nominal data rate supported by the optical port;
- a type of service supported by the optical port;
- a vendor of the client node at which the optical port is deployed;
- a line code used by the optical port; and
- an error protection code used by the optical port.

12. The method of claim 11, wherein the predefined set of attributes of an optical port further includes a provider of the service supported by the optical port.

13. The method of claim 10, further comprising, responsive to the port discovery equipment discovering a predefined set of attributes of a new client-side or edge-side optical port, determining whether that discovered set of attributes matches any set of attributes previously discovered for an edge-side or client-side optical port, respectively.

14. The method of claim 10, wherein said searching comprises, responsive to generally detecting the presence of a predefined signal on wavelength channels routed to the port discovery equipment, identifying on which specific wavelength channel that predefined signal is present, by iteratively blocking selected ones of the wavelength channels from being routed to the port discovery equipment and determining whether the predefined signal is still present at the port discovery equipment.

15. The method of claim 14, wherein said iteratively blocking is performed in a bifurcated fashion with respect to a spectrum of wavelength channels routed to the port discovery equipment.

16. The method of claim 10, wherein said searching comprises attempting to prompt the presence of a predefined signal on wavelength channels routed to the port discovery equipment, by iteratively transmitting an enabling signal on different ones of those wavelength channels, the enabling signal transmitted on any given wavelength channel configured to enable transmission by an optical port supported by that wavelength channel.

17. The method of claim 10, further comprising, responsive to re-routing the wavelength channel supporting a matching pair of optical ports, generating and sending an information signal indicating that one or both of the ports have been properly deployed.

18. The method of claim 10, further comprising determining whether the wavelength channel actually supporting a matching pair of optical ports corresponds to a wavelength channel that has been planned for supporting that matching pair, and generating and sending an information signal indicating that determination.

19. A node forming part of a wavelength division multiplexed (WDM) optical network, the node comprising:
   a tunable optical port that is tunable to any wavelength channel within a predefined set of wavelength channels allocated to the node;
   a controller configured, responsive to detecting that a fixed optical port has been communicatively connected to the tunable optical port, to:
     successively tune the tunable optical port to different wavelength channels within the predefined set while monitoring for feedback indicating that the fixed optical port has been properly deployed; and
     if said feedback has not been received after tuning the tunable optical port to each wavelength channel within the predefined set, sending feedback indicating that the fixed optical port has not been properly deployed.

20. A pluggable optical port module for use in a wavelength division multiplexed (WDM) optical network, the pluggable optical port module comprising:
   a first optical port that is tunable to any wavelength channel within a predefined set of wavelength channels;
   a controller configured, responsive to detecting that a second optical port at an access subnetwork node or a hub node has been connected to the first optical port, to:
     successively tune the first optical port to different wavelength channels within the predefined set while monitoring for feedback from the hub node indicating that the first optical port has been properly deployed; and
     if said feedback has not been received after tuning to each wavelength channel within the predefined set, signaling feedback indicating that the first optical port has not been properly deployed.

* * * * *

UNITED STATES PATENT AND TRADEMARK OFFICE
CERTIFICATE OF CORRECTION

PATENT NO. : 8,811,820 B2  
APPLICATION NO. : 13/731062  
DATED : August 19, 2014  
INVENTOR(S) : Dahlfort et al.

It is certified that error appears in the above-identified patent and that said Letters Patent is hereby corrected as shown below:

In the Specification

In Column 4, Lines 16-17, delete "metro network 20" and insert -- metro network 22 --, therefor.

Signed and Sealed this  
First Day of September, 2015

Michelle K. Lee  
*Director of the United States Patent and Trademark Office*